United States Patent
Park

(10) Patent No.: US 8,562,200 B2
(45) Date of Patent: Oct. 22, 2013

(54) LIGHTING MODULE, BACKLIGHT UNIT, AND DISPLAY DEVICE INCLUDING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 412 days.

(21) Appl. No.: 12/778,202

(22) Filed: May 12, 2010

(65) Prior Publication Data

US 2010/0290248 A1  Nov. 18, 2010

(30) Foreign Application Priority Data

May 13, 2009  (KR) .................. 10-2009-0041692

(51) Int. Cl.
*F21V 7/04* (2006.01)
*G09F 13/04* (2006.01)

(52) U.S. Cl.
USPC .............................. 362/633; 362/97.3; 349/58

(58) Field of Classification Search
USPC ................. 362/632, 633, 634, 97.1–97.4, 362/217.1–217.17, 23.09, 23.1, 23.17; 349/58, 60, 65
See application file for complete search history.

(56) References Cited

U.S. PATENT DOCUMENTS

| | | | | |
|---|---|---|---|---|
| 6,902,300 B2* | 6/2005 | Lee | | 362/306 |
| 7,128,461 B2* | 10/2006 | Hwang | | 362/632 |
| 7,156,549 B2* | 1/2007 | Hsieh | | 362/633 |
| 7,334,927 B2* | 2/2008 | Lai et al. | | 362/558 |
| 7,407,318 B2* | 8/2008 | Chang | | 362/632 |
| 7,766,534 B2 | 8/2010 | Iwasaki | | |
| 7,944,527 B2* | 5/2011 | Jeon et al. | | 349/65 |
| 2002/0044437 A1* | 4/2002 | Lee | | 362/31 |
| 2005/0146898 A1* | 7/2005 | Wu et al. | | 362/632 |
| 2005/0253980 A1* | 11/2005 | Saito et al. | | 349/64 |
| 2007/0019419 A1 | 1/2007 | Hafuka et al. | | |
| 2008/0088763 A1* | 4/2008 | Toriyama et al. | | 349/58 |
| 2008/0106905 A1 | 5/2008 | Zhang et al. | | |
| 2008/0304288 A1 | 12/2008 | Iwasaki | | |
| 2009/0256987 A1* | 10/2009 | Jeon et al. | | 349/58 |

FOREIGN PATENT DOCUMENTS

| | | |
|---|---|---|
| JP | 2008-053176 | 3/2008 |
| JP | 2008-89944 | 4/2008 |
| JP | 2008-305713 | 12/2008 |
| KR | 2007/0063665 | 6/2007 |

OTHER PUBLICATIONS

Korean Office Action dated Sep. 29, 2011.
Chinese Office Action dated Nov. 16, 2011.
Korean Office Action dated Jul. 30, 2010.
European Search Report dated Aug. 10, 2010.

* cited by examiner

*Primary Examiner* — Bao Q Truong
(74) *Attorney, Agent, or Firm* — KED & Associates, LLP

(57) ABSTRACT

Provided are a lighting module, a backlight unit, and a display device including the same. The lighting module may include a substrate, a plurality of light emitting diodes positioned on a first surface of the substrate, and at least one guide protrusion on the first surface of the substrate. The at least one guide protrusion may include a pin protruding from the first surface of the substrate and a cap coupled to the pin.

20 Claims, 2 Drawing Sheets

LIGHTING MODULE, BACKLIGHT UNIT, AND DISPLAY DEVICE INCLUDING THE SAME

CROSS-REFERENCE TO RELATED APPLICATION(S)

The present application claims priority under 35 U.S.C. 119 (a) of Korean Patent Application No. 10-2009-0041692 filed in Korea on May, 13, 2009, which is hereby incorporated by reference in its entirety.

BACKGROUND

1. Field

A lighting module, a backlight unit, and a display device including the same are disclosed herein.

2. Background

A lighting module, a backlight unit, and a display device are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

A liquid crystal display (LCD) device has various advantages such as compactness, lightness, and low power consumption. The LCD may be a substitute device capable of overcoming limitations of a cathode ray tube (CRT), and thus may be used in nearly all information processing devices that require a display unit. Since the LCD device is not a self-emission type display device, the LCD device requires a separate light source such as a backlight unit (BLU). A light emitting diode (LED) may be used as a light source for the BLU.

Figure 1:
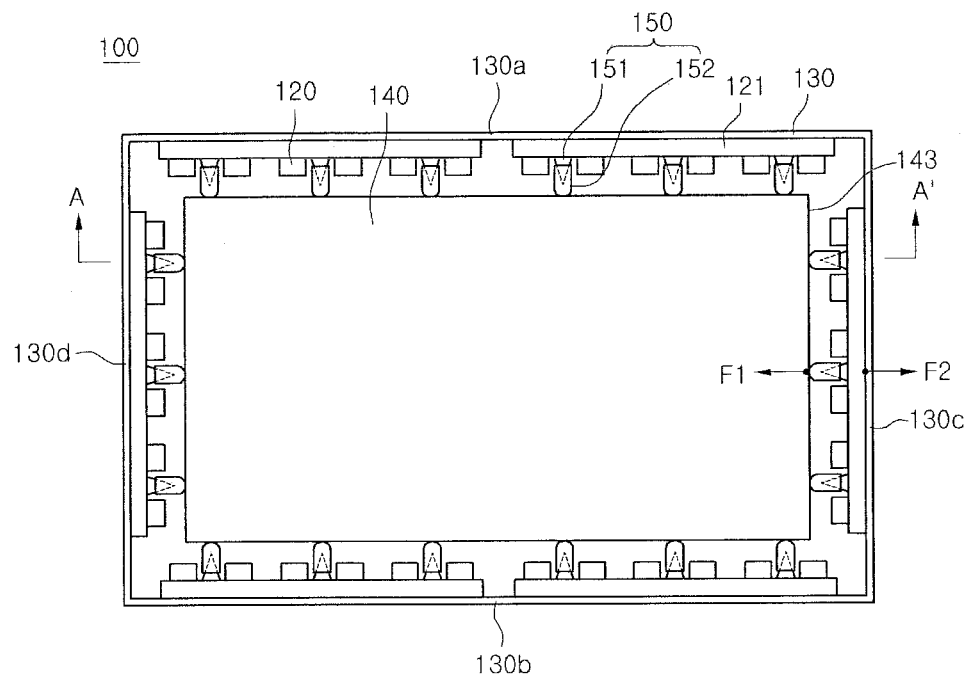
FIG. 1 is a plan view of a backlight unit (BLU) according to an embodiment.
Figure 2:
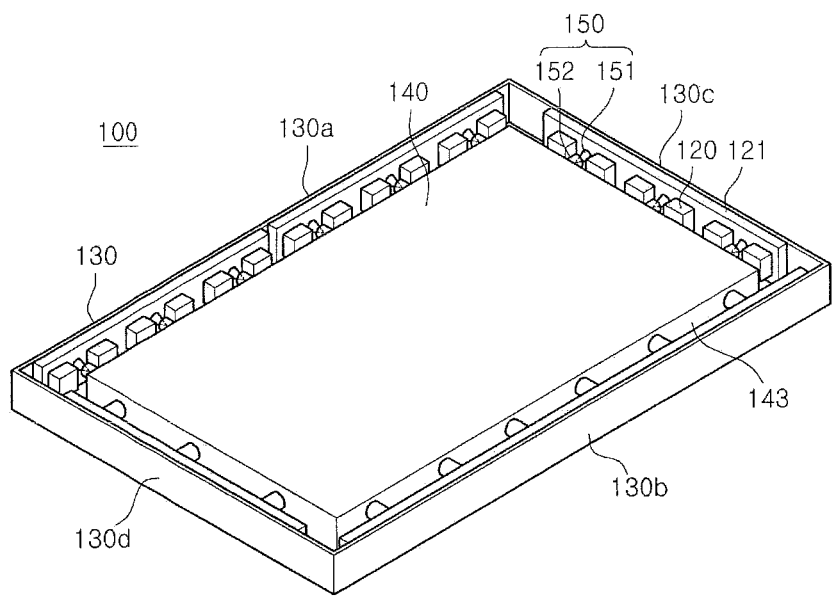
FIG. 2 is a perspective view of a BLU according to an embodiment.
Figure 3:
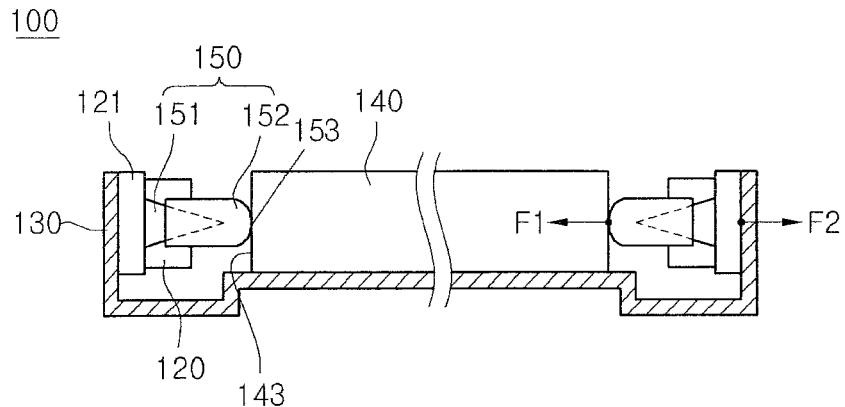
FIG. 3 is a sectional view taken along line A-A' of FIG. 1.

FIG. 1 is a plan view of a backlight unit (BLU) according to an embodiment. FIG. 2 is a perspective view of a BLU according to this embodiment. FIG. 3 is a sectional view taken along line A-A' of FIG. 1.

Referring to FIGS. 1 to 3, a BLU 100 according to this embodiment may include a light guide plate 140, at least one guide protrusion 150, a substrate 121, a plurality of light emitting diodes (LEDs) 120, and a bottom frame 130. The at least one guide protrusion 150 may contact a lateral surface 143 of the light guide plate 140. The at least one guide protrusion 150 may be positioned on a first surface of the substrate 121 that faces the lateral surface 143 of the light guide plate 140. The plurality of LEDs 120 may be mounted on the first surface of the substrate 121, and positioned along the lateral surface 143 of the light guide plate 140. The bottom frame 130 may receive the light guide plate 140 therein, and an inner surface of the bottom frame 130 may correspond to a second surface of the substrate 121.

Although the bottom cover 130 is illustrated as having a square frame shape in this embodiment, the present disclosure is not limited thereto. Further, the bottom cover 130 may be formed of a plastic, a reinforced plastic, a metal, or other appropriate material.

The substrate 121, the plurality of LEDs 120, and the at least one guide protrusion 150 may constitute a lighting module acting as a light source for the BLU 100. The substrate 121 may be disposed such that the second surface, opposite to the first surface, is mounted to the inner surface of the bottom frame 130. The plurality of LEDs 120 and the at least one guide protrusion 150 are disposed on the first surface.

As shown in FIGS. 1 to 3, the substrate 121 may be disposed on all inner surfaces of the bottom frame 130, for example, a top surface 130a, a bottom surface 130b, a right surface 130c, and a left surface 130d. However, as necessary, the substrate 121 may be freely disposed on any number of the inner surfaces of the bottom frame 130. For example, the substrate 121 may be disposed on only the top surface 130a and the left surface 130d of the bottom frame 130, or on only the right surface 130c of the bottom frame 130.

The substrate 121 may include one of a printed circuit board (PCB), a metal core PCB, a flexible PCB (FPCB), or any other appropriate types of circuit boards. The PCB may be a substrate in which complex circuits are printed on an insulation film. The insulation film may be formed of various materials, such as polyester (PET), polyphthalamide (PPA), an epoxy resin, a phenol resin, polyimide (PI), a prepreg, or other appropriate materials.

The plurality of LEDs 120 may include at least one of red, green, blue, and white light emitting diodes, which may emit red light, green light, blue light, and white light, respectively, but is not limited thereto. The plurality of LEDs 120 may be mounted on the first surface of the substrate 121 in an array form and disposed along the lateral surface 143 of the light guide plate 140. Although six LEDs 120 are shown in FIGS. 1 and 2 as being mounted on one substrate 121, the present disclosure is not limited thereto. Further, according to an embodiment, the lighting module may emit light in response to a driving signal applied from a power supply.

The at least one guide protrusion 150 may be disposed to protrude from the first surface of the substrate 121. Although at least one guide protrusion is shown as being disposed between the LEDs 120 in this embodiment, the at least one guide protrusion 150 may also be disposed below the LEDs 120 or at each end of the substrate 121, but is not limited thereto.

The at least one guide protrusion 150 may protrude from the substrate 121 toward the light guide plate 140 to contact the lateral surface 143 of the light guide plate 140, thereby compressing the lateral surface 143 of the light guide plate 140. The at least one guide protrusion 150 may compress the lateral surface 143 of the light guide plate 140 to firmly fix the light guide plate 140 in its position even when the light guide plate 140 moves due to thermal expansion. That is, when the light guide plate 140 is formed of a material having a relatively large coefficient of thermal expansion (CTE), the position of the light guide plate may change due to the thermal expansion from heat generated in the BLU. However, as the lateral surface 143 of the light guide plate 140 is compressed by the at least one guide protrusion 150, the light guide plate may remain fixed in its position. Also, when an external impact is applied to the BLU 100, the at least one guide protrusion 150 may compress the lateral surface 143 of the light guide plate 140 to absorb the external impact applied to the light guide plate 140.

The guide protrusions 150 on the substrate 121 disposed on the inner surfaces of the bottom cover 130, may each be of a same height. Also, the at least one guide protrusion 150 may have a height greater than that of at least one of the plurality of LEDs 120. For example, if the at least one guide protrusion 150 is configured to extend beyond the plurality of LEDs 120, it may protect the LEDs 120 from damage due to thermal expansion of the light guide plate 140, or from external impact applied to the BLU 100.

The at least one guide protrusion 150 may include a pin 151 and a cap 152. The pin 151 may protrude from the first surface of the substrate 121. As shown in FIG. 3, the pin 151 may have a cone shape, but is not limited thereto. For example, the pin 151 may have a triangular pyramid, a cylindrical shape, a polygonal pyramid shape, a polygonal column shape, a truncated circular cone shape, a truncated pyramid shape, or other appropriate shapes.

The pin 151 may be formed of a material having a high light reflectance, or a transparent material, to prevent light emitted from the LEDs 120 from being absorbed or blocked. For example, the pin 151 may be formed of PPA, PET, a resin, a metal, or other appropriate material. Further, a material having the high reflectance, such as sliver, may be plated or coated on a surface of the pin 151. An injection molding process may be used to form the pin 151, after which the pin 151 may be adhered to the substrate 121, but is not limited thereto. For example, a photoresist pattern may be formed on the substrate 121, and then, a deposition process may be performed using the photoresist pattern as a mask to form the pin 151.

The cap 152 may be disposed on the pin 151 such that it may be coupled to the pin 151. The cap 152 may contact the lateral surface 143 of the light guide plate 140 to compress the light guide plate 140. After the pin 151 is formed, the injection molding process may be performed again to form the cap 152. For example, a double injection molding process may be performed to form the pin 151 and the cap 152, but is not limited thereto.

The cap 152 may be formed of a transparent or semi-transparent material. For example, the cap 152 may be formed of a silicon material, a resin material, or other appropriate materials. Since the cap 152 is formed of the transparent or semi-transparent material, it may prevent the light emitted from the LEDs 120 from being absorbed or blocked. Further, the cap 152 may be formed of an elastic material or a material having elasticity greater than that of the pin 151. When the cap 152 has sufficient elasticity, the cap 152 may firmly hold the light guide plate 140 in place without damaging the cap 152 even when the light guide plate 140 thermally expands.

A recess, or a groove, having a shape corresponding to that of the pin 151 may be formed in a lower portion of the cap 152. The pin 151 may be positioned inside the recess such that the cap 152 is coupled to pin 151. Here, the pin 151 may be coupled to the cap 152 such that a free space remains in the recess beyond the pin 151. The free space in the recess may allow the pin 151 to be inserted further into the free space to absorb an impact, including a thermal expansion of the light guide plate 140 due to heat generated in the BLU. Thus, reliability of the BLU may be improved.

Also, although an end 153 of the cap 152 is shown in the figures to have a concave shape, the end 153 may have various shapes such that the end 153 may smoothly contact the lateral surface 143 of the light guide plate 140. Further, in another embodiment the at least one guide protrusion 150 may not include the cap 152, such that the pin 151 may directly contact the lateral surface 143 of the light guide plate 140.

The light guide plate 140 may be positioned along the guide protrusions 150 to allow the lateral surface 143 of the light guide plate 140 to contact the at least one guide protrusion 150. That is, the lateral or side surface of the light guide plate 140 may have an area and/or thickness such that the lateral surface 143 thereof contacts the at least one guide protrusion 150.

The light guide plate 140 may receive light incident from the plurality of LEDs 120 to produce planar light, and guide the planar light to a liquid crystal panel. The light guide plate 140 may be formed to have sufficient structural strength to prevent it from being easily broken or deformed. Further, the light guide plate 140 may be formed of a resin material, such as polymethylmethacrylate (PMMA), having a high transmittance.

Hereinafter, referring to FIGS. 1 to 3, a principle in which the substrate 121 and the bottom frame 130 are closely attached and fixed to each other by the at least one guide protrusion 150 will be described in detail.

Referring to FIG. 3, the at least one guide protrusion 150 may apply a force F1 to the light guide plate 140 as it contacts the light guide plate 140. Then, an equal and opposite force is generated by the light guide plate 140 which is transferred through the guide protrusion 150 and the substrate 121 to apply a force F2 to the bottom frame 130. Thus, the substrate 121 may be closely attached and fixed to the bottom frame 130. As the substrate 121 is closely attached and fixed to the at least one guide protrusion 150 and the button frame 130 by static forces, punch holes and coupling screws for mounting the substrate 121 to the bottom cover 130 may not be required. Also, if the coupling screw is not used, a protrusion due to the coupling screw may be eliminated, thereby making it easier to couple the BLU 100 to a support or a top case.

In another embodiment, to more firmly fix the substrate 121 to the bottom frame 130, an adhesive may be provided between the substrate 121 and the bottom frame 130, or alternatively, the substrate 121 and the bottom frame 130 may be coupled to each other using a coupling member, such as a screw, but are not limited thereto. Also, since the substrate 121 may be closely attached to the bottom cover 130, heat generated in the LEDs 120 disposed on the substrate 121 may be effectively transferred to the bottom cover 130.

Figure 4:
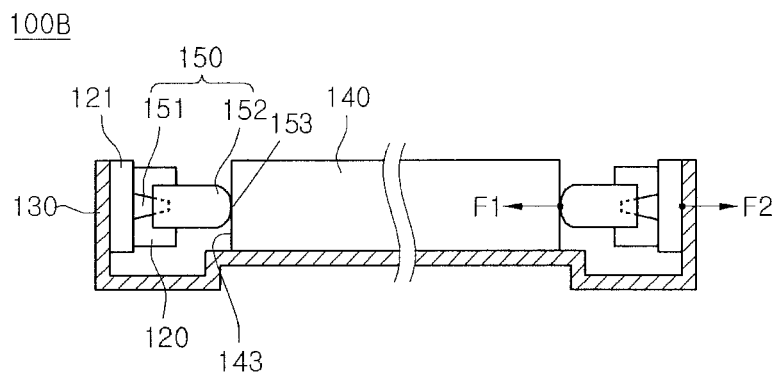
FIG. 4 illustrates a BLU according to an embodiment.

FIG. 4 illustrates a BLU 100B according to another embodiment. Referring to FIG. 4, the BLU 100B according to this embodiment may include a light guide plate 140, at least one guide protrusion 150, a substrate 121, a plurality of LEDs 120, and a bottom frame 130. The at least one guide protrusion 150 may contact a lateral surface 143 of the light guide plate 140. The at least one guide protrusion 150 may be positioned on a first surface of the substrate 121 that faces the lateral surface 143 of the light guide plate 140. The plurality of LEDs 120 may be mounted on the first surface of the substrate 121, and positioned along the lateral surface 143 of the light guide plate 140. The bottom frame 130 may receive the light guide plate 140 therein, and an inner surface of the bottom frame 130 may correspond to a second surface of the substrate 121.

The at least one guide protrusion 150 may include a pin 151 and a cap 152. Here, the pin 151 may have a height less than that of at least one of the plurality of LEDs 120. When the pin 151 has the height less than that of the at least one of the plurality of the LEDs 120, an amount of light absorbed by the pin 151 may be reduced. For example, when the pin 151 is formed of an opaque material, a light loss due to the pin 151 may occur. Thus, the pin 151 may have a height less than that of the at least one of the plurality of the LEDs 120 to minimize the light loss.

Also, when the pin 151 has a height less than that of the LEDs 120, a portion occupied by a length of the cap 152 in a structure of the at least one guide protrusion 150 may be increased, and thus, a buffer effect of the at least one guide protrusion 150 may be maximized. For example, a recess, e.g. groove, for inserting an upper portion of the pin 151 may be formed at a lower portion of the cap 152. As the cap 152 increases in length, the cap may provide greater protection to the lateral sides of the light guide plate 140 because a larger cap has less stiffness than a smaller cap. Further, a larger cap 152 allows the depth of the recess. As well as a free space inside the recess, to be increased when the cap 152 is coupled to the pin 151. Thus, when the light guide plate 140 is expanded by heat, or an external impact is applied to the light guide plate 140, the pin 151 may be inserted deeper into the free space to maximize a buffer effect of the at least one guide protrusion 150.

Figure 5:
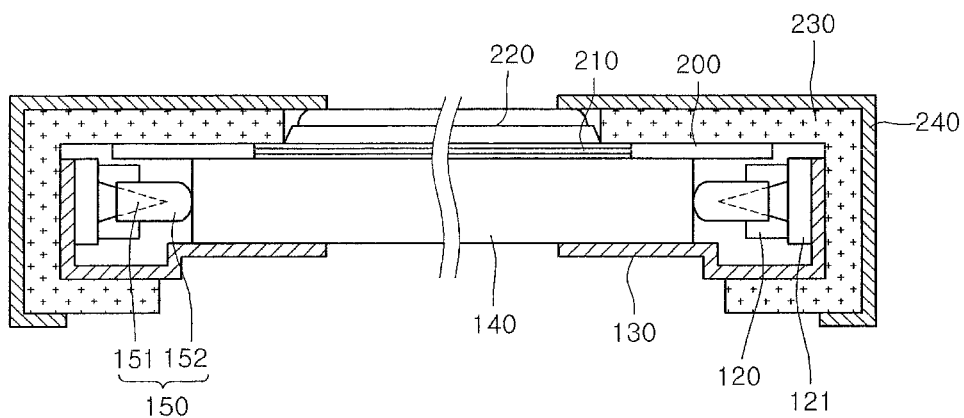
FIG. 5 is a sectional view of a display device including a BLU according to an embodiment.

FIG. 5 is a sectional view of a display device including a BLU according to an embodiment. Referring to FIG. 5, a reflective sheet 200, an optical sheet 210, and a liquid crystal panel 220 may be disposed on a BLU 100 according to an embodiment. A support 230 and a top case 240 for receiving and supporting the reflective sheet 200, the optical sheet 210, and the liquid crystal panel 220 may be provided to form a display device.

The reflective sheet 200 may reflect light emitted from the LEDs 120 to prevent the light from being lost. The reflective sheet 200 may be provided on a top surface, as well as, on a bottom surface of the light guide plate 140. The optical sheet 210 may include at least one of a diffusion sheet disposed on a top surface of the light guide plate 140 to diffuse light, a light concentrating sheet to concentrate the diffused light, and a protection sheet to protect patterns disposed on the light concentration sheet.

The liquid crystal panel 220 may be positioned on the optical sheet 210. Although not shown in detail, the liquid crystal panel 220 may include a thin film transistor substrate including a plurality of thin film transistors, a color filter substrate disposed on the thin film transistor substrate, and a liquid crystal disposed between the thin film transistor substrate and the color filter substrate. Also, an integrated circuit (IC) chip may be disposed at an end of the thin film transistor substrate. The IC chip may generate an image signal and a scan signal to drive a liquid crystal display device, and may also generate a plurality of timing signals to apply the signals. Then, the IC chip may apply the image signal and the scan signal to a gate line and a data line of the liquid crystal display panel 220.

In the description of embodiments, it will be understood that when a layer (or film), region, pattern or structure is referred to as being 'on' another layer (or film), region, pad or pattern, the terminology of 'on' and 'under' includes both the meanings of 'directly' and 'indirectly', and one or more intervening layers may also be present. Further, the reference about 'on' and 'under' each layer will be made on the basis of drawings. In the drawings, the thickness or size of each layer is exaggerated, omitted, or schematically illustrated simply for ease of explanation. Also, the size of each element as illustrated does not entirely reflect an actual size or a relative size to other elements.

In one embodiment, a lighting module comprises: a substrate; a plurality of light emitting diodes on a first surface of the substrate; and at least one guide protrusion on the first surface of the substrate, wherein the at least one guide protrusion comprises a pin protruding from the first surface of the substrate and a cap coupled to the pin.

In another embodiment, a backlight unit comprises: a light guide plate; at least one guide protrusion contacting a lateral surface of the light guide plate; a substrate in which the at least one guide protrusion is disposed on a first surface thereof; a plurality of light emitting diodes disposed along the lateral surface of the light guide plate on the first surface of the substrate; and a bottom cover in which the substrate is disposed on an inner surface thereof, the bottom cover receiving the light guide plate.

In further another embodiment, a display device comprises: a backlight unit comprising a light guide plate, at least one guide protrusion contacting a lateral surface of the light guide plate, a substrate in which the at least one guide protrusion is disposed on a first surface thereof, a plurality of light emitting diodes disposed along the lateral surface of the light guide plate on the first surface of the substrate, and a bottom cover in which the substrate is disposed on an inner surface thereof, the bottom cover receiving the light guide plate; an optical sheet on the backlight unit; and a liquid crystal panel on the optical sheet.

A lighting module is broadly described and embodied herein, and may include a substrate; a plurality of light emitting diodes on a first surface of the substrate; and at least one guide protrusion on the first surface of the substrate, wherein the at least one guide protrusion comprises a pin protruding from the first surface of the substrate and a cap coupled to the pin, and the at least one guide protrusion has a height greater than a height of the light emitting diodes.

The lighting module is broadly described and embodied herein, wherein the at least one guide protrusion is disposed between the plurality of light emitting diodes; wherein the at least one guide protrusion comprises a plurality of guide protrusions having the same height; wherein the pin has a height greater than a height of the plurality of light emitting diodes; wherein the pin has a height different than those of the plurality of light emitting diodes; wherein the pin is formed of PPA, PET, a resin, or a metal; wherein a material having a high reflectance is plated or coated on a surface of the pin; wherein the cap is formed of a silicon material or a resin material having light transmittance; wherein the pin has at least one of a cone shape, a cylindrical shape, a polygonal pyramid shape, a polygonal column shape, a truncated circular cone shape, or a truncated pyramid shape; wherein the cap includes a recess having a shape corresponding to that of the pin, and at least portion of the pin is inserted into the recess; and the cap has elasticity greater than that of the pin.

A backlight unit is broadly described and embodied herein, and may include a light guide plate; at least one guide protrusion contacting a lateral surface of the light guide plate; a substrate in which the at least one guide protrusion is disposed on a first surface thereof; a plurality of light emitting diodes disposed along the lateral surface of the light guide plate on the first surface of the substrate; and a bottom frame in which the substrate is disposed on an inner surface thereof, the bottom frame receiving the light guide plate, the at least one guide protrusion having a height greater than a height of the light emitting diodes.

The backlight unit is broadly described and embodied herein, wherein a second surface opposite to the first surface of the substrate contacts the inner surface of the bottom frame; wherein at least one substrate is disposed on the inner surface of the bottom frame; and wherein the at least one guide protrusion comprises a pin protruding from the first surface of the substrate and a cap coupled to the pin to compress the lateral surface of the light guide plate.

The backlight unit is broadly described and embodied herein, wherein a material having a high reflectance is plated or coated on a surface of the pin; wherein the cap is formed of a silicon material or a resin material having light transmittance; wherein the pin has at least one of a cone shape, a cylindrical shape, a polygonal pyramid shape, a polygonal column shape, a truncated circular cone shape, or a truncated pyramid shape; and wherein the cap comprises a recess having a shape corresponding to that of the pin, and at least portion of the pin is inserted and coupled into/to the recess.

A display device is broadly described and embodied herein, and may include a backlight unit comprising a light guide plate, at least one guide protrusion contacting a lateral surface of the light guide plate, a substrate in which the at least one guide protrusion is disposed on a first surface thereof, a plurality of light emitting diodes disposed along the lateral surface of the light guide plate on the first surface of the substrate, and a bottom frame in which the substrate is disposed on an inner surface thereof, the bottom frame receiving the light guide plate, the at least one guide protrusion having a height greater than a height of the light emitting diodes; an optical sheet on the backlight unit; and a liquid crystal panel on the optical sheet.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting module comprising:
    a substrate;
    a plurality of light emitting diodes on a first surface of the substrate; and
    at least one guide protrusion on the first surface of the substrate,
    wherein the at least one guide protrusion comprises a pin protruding from the first surface of the substrate and a cap coupled to the pin, and the pin has a height less than a height of the light emitting diodes.

2. The lighting module according to claim 1, wherein the at least one guide protrusion is disposed between the plurality of light emitting diodes.

3. The lighting module according to claim 1, wherein the pin is formed of PPA, PET, a resin, or a metal.

4. The lighting module according to claim 1, wherein a material having a high reflectance is plated or coated on a surface of the pin.

5. The lighting module according to claim 1, wherein the cap is formed of a silicon material or a resin material having light transmittance.

6. The lighting module according to claim 1, wherein the pin has at least one of a cone shape, a cylindrical shape, a polygonal pyramid shape, a polygonal column shape, a truncated circular cone shape, or a truncated pyramid shape.

7. The lighting module according to claim 1, wherein the cap includes a recess having a shape corresponding to that of the pin, and at least portion of the pin is inserted into the recess.

8. The lighting module according to claim 1, wherein the cap has elasticity greater than that of the pin.

9. A backlight unit comprising:
    a light guide plate;
    at least one guide protrusion contacting a lateral surface of the light guide plate;
    a substrate in which the at least one guide protrusion is disposed on a first surface thereof;
    a plurality of light emitting diodes disposed along the lateral surface of the light guide plate on the first surface of the substrate; and
    a bottom frame in which the substrate is disposed on an inner surface thereof, the bottom frame receiving the light guide plate, wherein a pin of the at least one guide protrusion has a height less than a height of the light emitting diodes, and wherein a height of a space between the light guide plate and the substrate is greater than a height of a plurality of light emitting diodes.

10. The backlight unit according to claim 9, wherein a second surface opposite to the first surface of the substrate contacts the inner surface of the bottom frame.

11. The backlight unit according to claim 9, wherein at least one substrate is disposed on the inner surface of the bottom frame.

12. The backlight unit according to claim 9, wherein the at least one guide protrusion comprises the pin protruding from the first surface of the substrate and a cap coupled to the pin to compress the lateral surface of the light guide plate.

13. The backlight unit according to claim 12, wherein a material having a high reflectance is plated or coated on a surface of the pin.

14. The backlight unit according to claim 12, wherein the cap is formed of a silicon material or a resin material having light transmittance.

15. The backlight unit according to claim 12, wherein the pin has at least one of a cone shape, a cylindrical shape, a polygonal pyramid shape, a polygonal column shape, a truncated circular cone shape, or a truncated pyramid shape.

16. The backlight unit according to claim 12, wherein the cap comprises a recess having a shape corresponding to that of the pin, and at least portion of the pin is inserted and coupled to the recess.

17. A display device comprising:
    a backlight unit comprising a light guide plate, at least one guide protrusion contacting a lateral surface of the light guide plate, a substrate in which the at least one guide protrusion is disposed on a first surface thereof, a plurality of light emitting diodes disposed along the lateral surface of the light guide plate on the first surface of the substrate, and a bottom frame in which the substrate is disposed on an inner surface thereof, the bottom frame receiving the light guide plate, wherein the at least one guide protrusion having comprises a pin protruding from the first surface of the substrate and a cap coupled to the pin, wherein the pin has a height less than a height of the light emitting diodes;
    an optical sheet on the backlight unit; and
    a liquid crystal panel on the optical sheet, wherein a height of a space between the light guide plate and the substrate is greater than a height of the plurality of light emitting diodes.

18. The lighting module according to claim 1, wherein the cap has a height greater than a height of the plurality of light emitting diodes.

19. The lighting module according to claim 1, wherein the cap is disposed on the plurality of light emitting diodes and the cap compresses a lateral surface of a light guide plate.

20. The lighting module according to claim 1, wherein the at least one guide protrusion contacts a lateral surface of a light guide plate, and wherein a height of a space between the light guide plate and the substrate is greater than a height of the a plurality of light emitting diodes.

* * * * *